Figure 5:
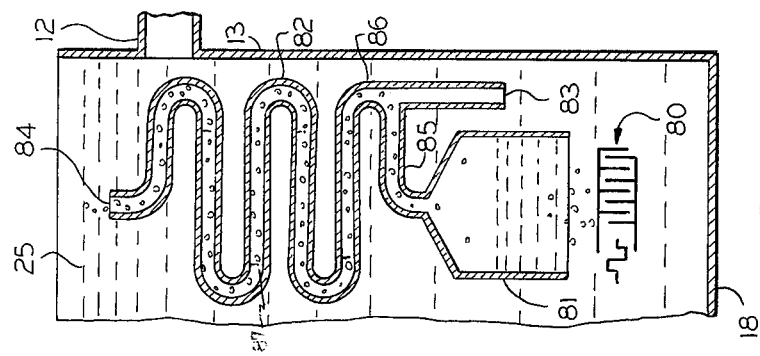

United States Patent [19]

Wikey

[11] 4,005,014
[45] Jan. 25, 1977

[54] WATER TREATMENT SYSTEM WITH PROLONGED AERATION

[76] Inventor: Arnold Wikey, 5040 W. Newport, Chicago, Ill. 60641

[22] Filed: Oct. 2, 1975

[21] Appl. No.: 618,885

Related U.S. Application Data

[63] Continuation of Ser. No. 470,794, May 17, 1974, abandoned.

[52] U.S. Cl. .............................. 210/192; 204/149; 210/220
[51] Int. Cl.² .......................................... C02C 1/10
[58] Field of Search ................ 204/149, 275, 277; 210/15, 63, 192, 220, 221 R, 7; 261/1, 77, 123, DIG. 75

[56] References Cited

UNITED STATES PATENTS

| | | | |
|---|---|---|---|
| 1,157,233 | 10/1915 | Lashmet | 204/149 |
| 2,054,316 | 9/1936 | Gilbert | 210/63 X |
| 3,503,593 | 3/1970 | Nelson | 261/DIG. 75 |
| 3,547,811 | 12/1970 | McWhirter | 210/7 |
| 3,617,033 | 11/1971 | Ichikawa et al. | 261/123 X |
| 3,683,627 | 8/1972 | Girden | 261/123 X |

FOREIGN PATENTS OR APPLICATIONS

| | | | |
|---|---|---|---|
| 48,277 | 8/1889 | Germany | 261/123 |

Primary Examiner—Frank A. Spear, Jr.
Assistant Examiner—Robert H. Spitzer
Attorney, Agent, or Firm—Alter and Weiss

[57] ABSTRACT

In a water treatment system, an electrolysis unit breaks water into its constituent gases of oxygen and hydrogen. Baffles capture and temporarily hold the resulting gas to prolong periods of aeration in the oxygen. Various vertical arrangements of baffles capture the gas escaping from the next lower baffles in a manner which assists in displacing slow moving water while resisting premature loss of oxygen to fast moving water.

3 Claims, 6 Drawing Figures

WATER TREATMENT SYSTEM WITH PROLONGED AERATION

This is a continuation of application Ser. No. 470,794 filed May 17, 1974, now abandoned.

This invention relates to water treatment and more particularly to equipment for and methods of treating, aerating, and purifying water over prolonged periods of time.

Reference is made to my earlier U.S. Pat. No. 3,769,196, granted Oct. 30, 1973, for treating, aerating, and purifying water. As taught in that patent, a stack of two or more electrically conductive plates are spaced apart, insulated from each other, and immersed in water. An electrical power source oppositely polarizes adjacent plates. Thus, a low voltage field is formed in the water and periodically reversed in polarity to prevent any buildup of impurities on the plates. With the low voltage applied across alternate plates, the water electrolyzes and breaks into oxygen and hydrogen gases which bubble off into the water.

The teachings of my earlier patent produced excellent results; however, it is not as economical as it might be. The oxygen bubbles off and leaves the water before the maximum aerating value is extracted from it. Thus, there is a need for a more efficient utilization of the oxygen while it is bubbling through the water.

Accordingly, an object of the invention is to provide a new and improved water treatment system. Here an object is to extract greater levels of aeration from oxygen bubbling through the water. In particular, an object is to improve efficiency of water treatment systems.

Another object of the invention is to expose water to aerating oxygen for longer periods of time than was heretofore done.

In keeping with an aspect of the invention, these and other objects are accomplished by one or a vertical series of baffles placed over an electrolyzing unit, which baffles control a passage of oxygen through the water. The baffles prolong the water treatment because they both delay the passage of oxygen out of water and distribute the aerated water within a body of water.

Figure 4:
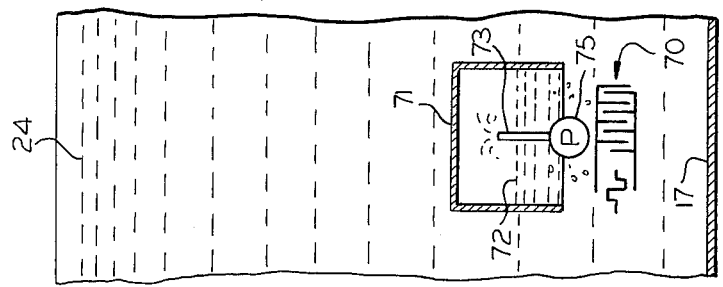
Figure 3:
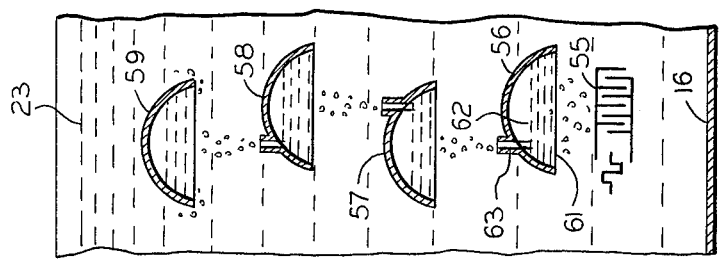
Figure 2:
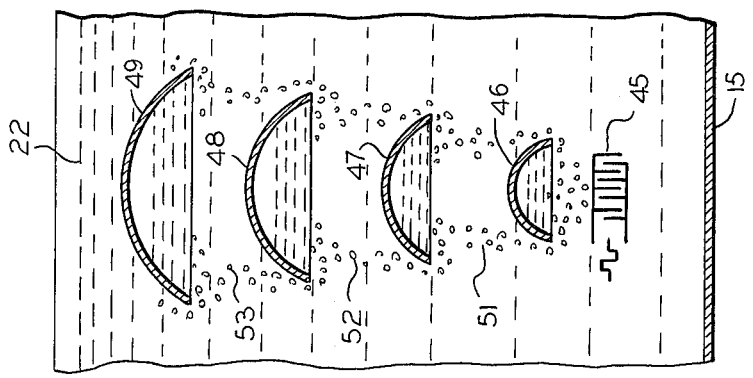
Figure 1:
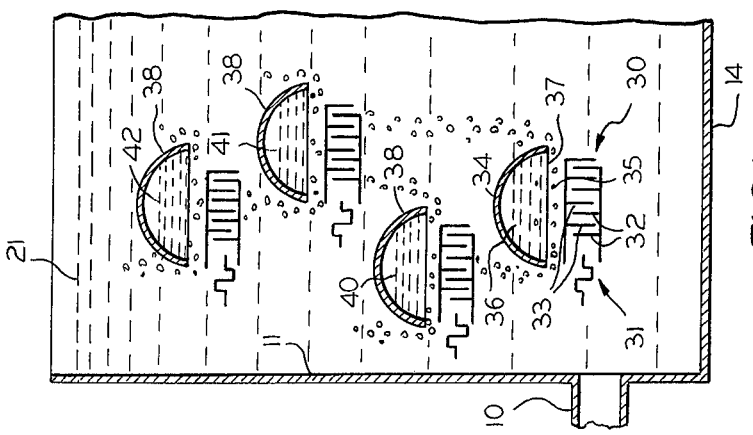
Figure 6:
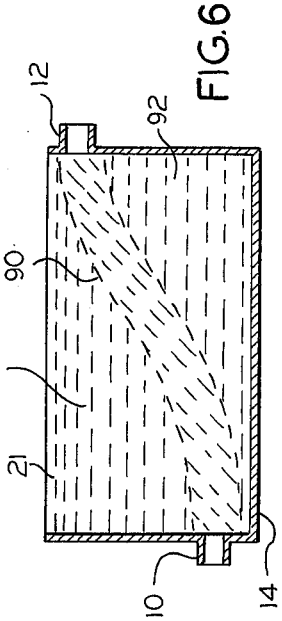

The nature of various baffles which are incorporated into the inventive structure may be understood best from the following description of the attached drawings wherein:

FIG. 1 is a schematic showing of an exemplary water treatment tank, having an inlet and a vertically disposed series of baffles with an electrolysis unit individually associated with each baffle;

FIG. 2 schematically shows a vertically aligned series of baffles associated with one common electrolysis unit;

FIG. 3 schematically shows a vertically disposed series of baffles, also associated with one common electrolysis unit, each baffle having an exhaust port;

FIG. 4 schematically shows a combination of an electrolysis unit, a baffle, and a spray unit;

FIG. 5 schematically shows a serpentine pipe baffle for delaying oxygen as it passes through the water; and FIG. 6 is a graphical representation of how water entering a treatment tank is dispersed in its flow between an inlet and an outlet.

Each of the various figures includes a representative portion of a water treatment tank. An inlet pipe 10 is connected to bring water preferably into a lower portion of a side wall 11 of a treatment tank. An outlet pipe 12 preferably removes water from an upper portion of an opposite side wall 13 of the treatment tank. Thus, water tends to flow more strongly in a stream extending from the lower left toward the upper right. Small segments of the bottom of the treatment tanks are shown at 14–18. In each figure, the top or upper surface of the water is shown, as at 21–25, for example.

The objective of the invention is to draw water into the inlet pipe 10 and to thereafter break some of it down into gaseous oxygen by electrolysis. The resulting oxygen bubbles through and thereby aerates the water. The aerated water is then discharged through pipe 12. It has also been noted that bacteria and other unwanted life forms are killed on exposure of the water to the gaseous environment.

The electrolysis apparatus is here shown by a symbol, as at 30, representing interleaved plates of opposite electrical polarity. This apparatus is described in my above noted U.S. Pat. No. 3,769,196. Briefly, a reversing polarity from a DC power supply is schematically shown by a square wave form, as at 31. This DC power supply energizes the electrode unit comprising a plurality of juxtaposed plates or electrodes, such as electrodes 32 and 33. In a preferred embodiment of the invention, the electrodes are plates made of platinum coated titanium held in a spaced parallel relationship by "Teflon" insulators (not shown). Thus, there are no direct electrical connections between plates in group 32 and in group 33. When plates 32 are positively polarized, plates 33 are negatively polarized; therefore, a weak current of periodically reversing polarity passes through the water between the plates.

In a preferred embodiment, the plates 32, 33 are about one sixty-forth inch apart and energized by a 6-volt DC source. The amperage between the plates depends on the size of the plates and the conductivity of the water. Preferably, the current is in the order of one-half amp. With this low voltage across the alternate plates 32, 33, the water tends to electrolyze and break into its constituent gases (i.e., two parts hydrogen and one part oxygen). With a platinum coated titanium plate, the bubbles of gas are extremely small, and the plates themselves tend to resist any buildup of residue of impurities thereon. In addition, the reversing of the polarity tends to clean the plates and maximize the electrolysis. In my earlier patent, the gases so produced merely bubbled up through the water, escaping to surface 21 and dispersing into the atmosphere. As the bubbles move, the water is aerated.

According to the invention, a dome shaped cover plate is placed above the electrolysis unit to capture the bubbling gas after it breaks down. For example, in FIG. 1 a dome shaped baffle plate 34 is positioned immediately above the electrolysis unit 30. Likewise, each of many other dome plates are also positioned above other electrolysis units. Thus, the gas bubbles 35 are entrapped to displace water and form an air pocket inside the dome 34. As more gas is entrapped inside dome 35, the volume of the air pocket grows larger, forcing down the upper surface 36 of the water level inside the dome. Eventually, the surface 36 reaches a point at the bottom of the dome skirt 37. Then, some of the gas escapes from the dome.

A plurality of similar dome shaped baffles 38 are vertically disposed in the water above the baffle 34 and horizontally positioned to catch some of the bubbles which are rising from the skirt of a lower placed baffle. Therefore, some of the escaping gas bubbles up immediately to surface 21 and other of the escaping gas is captured in a baffle dome 38 positioned above the periphery of dome 34. Thus, the oxygen produced by electrolysis is held within the water for longer periods of time. The surfaces 36, 40, 41, 42 of water enclosed within the domes provide greater absorption areas. The electrolyzed gas is pure oxygen and hydrogen; therefore, it is an enriched source of oxygen as compared to the ambient atmosphere.

The example of FIG. 1 is fairly simple in that it assumes one baffle for each electrolysis unit 30. As here shown, the baffles are more or less vertically oriented so that gas escaping from one baffle rises toward the next higher level of baffles. They are also horizontally disposed so that the center of one dome is above the skirt of a lower dome. However, it is also possible to arrange the baffles in any other manner. In any event, the baffles of FIG. 1 will enable some of the bubbles to rise directly to surface 21 and some to be captured by a higher baffle. This combination of direct and indirect assent plus the power of a plurality of electrolysis units helps move sluggish water.

FIG. 2 shows an alternative arrangement wherein each electrolysis unit 45 has vertically arranged thereover a co-axially disposed succession of baffles 46–49. Each baffle is slightly larger in diameter than the baffle immediately below it, and all baffles are aligned along a common vertical axis. Therefore, the bubbles of oxygen 51 escaping from baffle 46 are entrapped by the next higher baffle 47. Likewise escaping bubbles 52 and 53 are entrapped by the next higher baffles 48, 49, respectively. Here, almost all escaping gas is entrapped. There is only a very little amount of direct assent of bubbles from a much lower baffle, as found in FIG. 1. The rising bubbles churn the water and help move it. Thus, this arrangement is especially appropriate for slower moving water.

A somewhat different scheme is seen in FIG. 3 where each electrolysis unit 55 has vertically arranged thereover a series of baffles 56–59. Each of these baffles 56–59 has therein an exhaust port (as at 63) which is above the periphery of the skirt 61 of the baffle. Each exhaust port is directly below the center of the next higher dome. Therefore, instead of randomly escaping at some unpredictable location around the perimeter of skirt 61, the entrapped oxygen escapes up exhaust port 63 and directly into the next higher baffle. The escape occurs when the expanding gas bubble forces the enclosed water surface 62 fall below the entrance to the port 63. Since each baffle is positioned directly over the exhaust port in the next lower baffle, the escaping gas follows a predictable path because the entire perimeter of skirt 61 is still sealed by surface 62 when the gas escapes. Therefore, this arrangement is particularly appropriate for faster moving water.

After a moment's reflection, it should be completely apparent that the principles depicted in FIGS. 1–3 may be combined in any desired manner to produce any desired effect. The baffles may be aligned vertically in a manner which insured entrappment of all, some, or none of the gas escaping from a lower baffle and moving toward a higher baffle or toward the surface of the water. This concept is important since various treatment systems require different timing and aeration arrangements.

FIG. 4 shows another feature which may be added to any or all of the structures shown in FIGS. 1–3. More particularly, the electrolysis unit 70 is positioned beneath a relatively large housing 71 capable of receiving and storing substantial amounts of gas. A pipe 73 extends from a pump 75 up to and above the surface level 72 of enclosed water, for spraying ambient water into the gas entrapped in the enclosure 71. Since the gas is derived from electrolyzed water, the gas entrapped in housing 71 is pure oxygen and hydrogen. Thus, the aeration inside housing 41 is more efficient than it would be in a polluted atmosphere of smoke, exhaust fumes, and the like. Of course, the techniques of FIGS. 1–3 may be combined with and used to delay the assent of any bubbles escaping from the enclosure 71.

Another approach is seen in FIG. 5. Here, bubbles from the electrolysis unit 80 are captured in housing 81. The top of the housing is attached to a serpentine pipe 82, rising toward the upper surface of the water 25. The lower end of the serpentine pipe 82 is open to the water at 83, and the upper end is open at 84. Therefore, the pipe is nominally full of water.

As the gas rising into housing 81 passes through tube 85, it reaches a junction 86 with the serpentine pipe 82. The gas then rises in a pipe 82 and bubbles up through the water entrapped therein. The rising gas tends to aerate and carry some water along with it and to discharge the water out the end 84. This discharged water is replaced by ambient water drawn into the pipe at 83. In view of the length of the serpentine pipe 82, the enclosed water is treated to aeration over relatively long periods of time as compared to the time required for a direct ascent of bubbles. Also, baffles, such as baffle 87, further show the ascent of the gases.

FIG. 6 schematically represents the tank 14 having water flowing into the bottom of one side and out the top of the other side. Thus, there tends to be a swifter current (here shown by cross-hatching 90) flowing between the inlet and outlet than in the more remote uncross-hatched recesses 91, 92. Accordingly, the nature and arrangement of the baffles should take into account this differential in the rate of flow. For example, the structure of FIG. 5 would tend to draw water from the relatively slow moving area 92 and to project it directly through the swiftly flowing stream 90 and into the out flow at 12. The churning water caused by the horizontal distribution of bubbles shown in FIG. 1 would tend to distribute the aeration into and to stir the slower moving water in area 91. The more precisely guided bubbles of FIG. 3 might be more appropriate for a distribution of aeration in the center and swifter moving zone of water 90. The structure in FIG. 4 may be fairly immune to the ambient flow. Thus, the principles taught herein may be combined and used in different zones of the tank depending upon the ambient conditions of the water under treatment.

Those who are skilled in the art will readily perceive how modifications may be made in the disclosed structures. Therefore, the appended claims should be construed to cover all equivalent structures.

I claim:

1. A water treatment system for purifying and aerating water, by exposing the water to a pressurized oxygenated atmosphere, said water treatment means comprising the combination of:

diffusion means for diffusing bubbles of oxygen in the water being purified and aerated, baffle means comprising at least one inverted container, said baffle means positioned a fixed distance below the surface of the water and arranged to capture the gases being diffused through the water, said baffle means comprising means enabling the escape of said captured gases when the pressure due to the build up of gases within the baffle means exceeds the pressure due to the distance of the baffle means below the surface of the water, whereby the atmosphere of pressurized gases builds up in said baffle means, aeration means for mechanically aerating the water within the pressurized gases in said baffle means, said aeration means comprising pump and spray apparatus located under said at least one inverted container for spraying ambient water into the captured pressurized gases within said at least one inverted container, and said diffusion means comprising electrolysis means located under said at least one inverted container, said electrolysis means comprising platinum plated titanium electrodes, simultaneously providing an oxygenated atmosphere under said baffle means by breaking down the water into extremely small bubbles of its component gases, aerating the water by diffusion, and maintaining the pressurized gases in said baffle means.

2. The system of claim 1 wherein there is a vertically disposed plurality of said baffle means in said water, said baffle means being horizontally positioned to capture some of the gas escaping from lower baffles while enabling a direct assent of other escaping gases.

3. The system of claim 1 wherein there is a vertically disposed plurality of said baffle means with each succeeding baffle means being positioned to capture virtually all gas escaping from the next lower baffle means, and wherein each of said baffle means is circular, each succeeding one of said baffle means in an ascending position in said vertical plurality has a diameter which is larger than the next lower baffle means and all of said baffle means are vertically aligned along a common axis, whereby gas escaping from the periphery of any baffle is captured by the next higher baffle.

* * * * *